United States Patent
Florczak

(10) Patent No.: US 11,160,251 B2
(45) Date of Patent: Nov. 2, 2021

(54) ANIMAL EAR TAG

(71) Applicant: DELAVAL HOLDING AB, Tumba (SE)

(72) Inventor: Keld Florczak, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/057,416

(22) PCT Filed: May 20, 2019

(86) PCT No.: PCT/SE2019/050457
§ 371 (c)(1),
(2) Date: Nov. 20, 2020

(87) PCT Pub. No.: WO2019/226101
PCT Pub. Date: Nov. 28, 2019

(65) Prior Publication Data
US 2021/0204513 A1 Jul. 8, 2021

(30) Foreign Application Priority Data
May 23, 2018 (SE) .................................. 1850606-3

(51) Int. Cl.
*A01K 11/00* (2006.01)
*G08C 17/02* (2006.01)

(52) U.S. Cl.
CPC ............ *A01K 11/004* (2013.01); *G08C 17/02* (2013.01)

(58) Field of Classification Search
CPC .............................. A01K 11/004; G08C 17/02
(Continued)

(56) References Cited

U.S. PATENT DOCUMENTS 6,232,880 B1 * 5/2001 Anderson ............ A01K 15/023
119/421
9,848,577 B1 * 12/2017 Brandao ................ A61D 13/00
(Continued)

FOREIGN PATENT DOCUMENTS

DE 20 2010 008 325 1/2012
WO 2010/108496 9/2010
(Continued)

OTHER PUBLICATIONS

Search Report for SE Patent Application No. 1850606-3 dated Dec. 18, 2018, 2 pages.
(Continued)

*Primary Examiner* — Omar Casillashernandez
(74) *Attorney, Agent, or Firm* — Nixon & Vanderhye

(57) ABSTRACT

An animal ear tag contains control circuitry for generating data. An antenna in the tag emits a wireless signal including the data, and an energy storage provides electric energy to the control circuitry and the antenna. The energy storage is arranged in a first part of the tag and the antenna is arranged in a second part of the tag. When attached to the animal, the first and second parts are interconnected via a shaft member inserted through an ear of the animal in such a manner that the first part is located on a first side of the ear and the second part is located on a second side of the ear. When the first and second parts are interconnected, the energy storage is located off-centered from a symmetry axis of the shaft member. As a result, the tag becomes relatively fixed in a well-defined orientation.

20 Claims, 3 Drawing Sheets

(58) Field of Classification Search
USPC .................................................. 340/870.07
See application file for complete search history.

(56) References Cited

U.S. PATENT DOCUMENTS

| | | | | |
|---|---|---|---|---|
| 2002/0148146 A1* | 10/2002 | Hogan | ................ | A01K 11/008 |
| | | | | 40/301 |
| 2016/0227742 A1* | 8/2016 | Rovnyi | ................ | A61B 5/0022 |
| 2018/0098521 A1* | 4/2018 | Auer | .................... | G06K 19/077 |
| 2018/0132449 A1* | 5/2018 | Auer | .................... | A01K 29/005 |

FOREIGN PATENT DOCUMENTS

| | | |
|---|---|---|
| WO | 2011/153571 | 12/2011 |
| WO | 2016/172745 | 11/2016 |
| WO | 2019/009717 | 1/2019 |

OTHER PUBLICATIONS

International Search Report for PCT/SE2019/050457 dated Jul. 22, 2019, 4 pages.
Written Opinion of the ISA for PCT/SE2019/050457 dated Jul. 22, 2019, 7 pages.

* cited by examiner

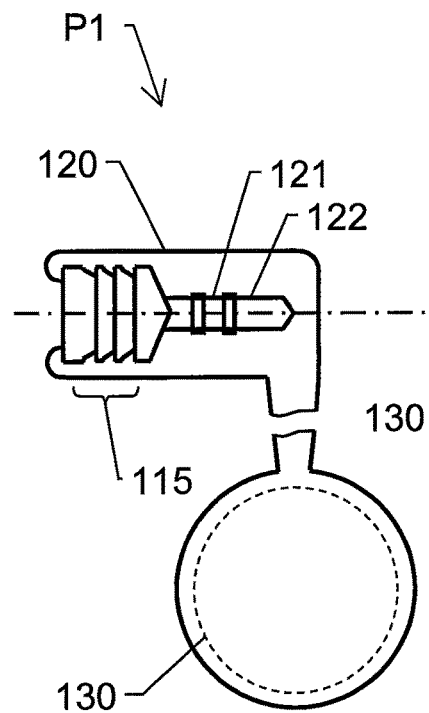
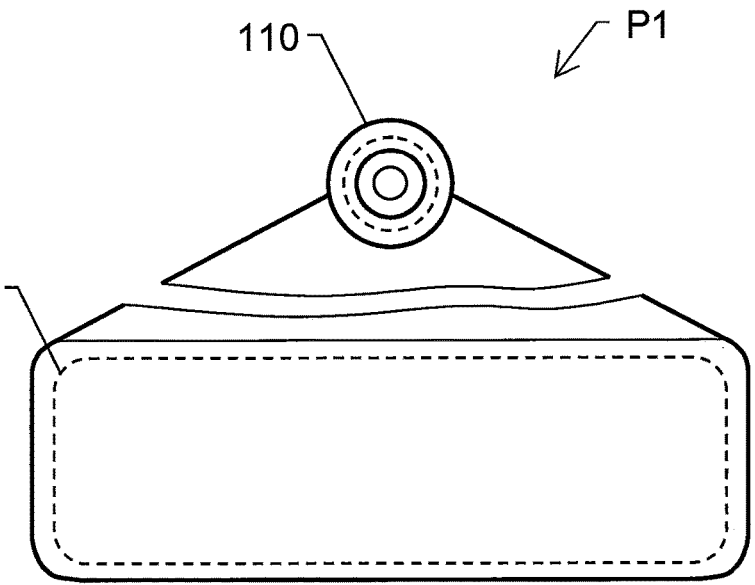
Fig. 1a                    Fig. 1b
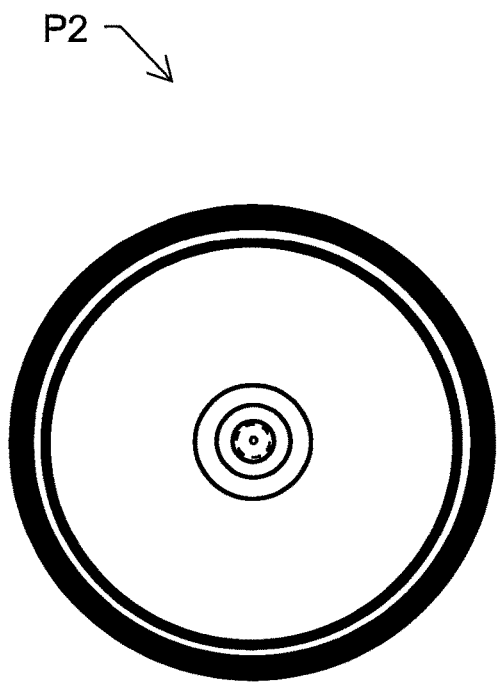
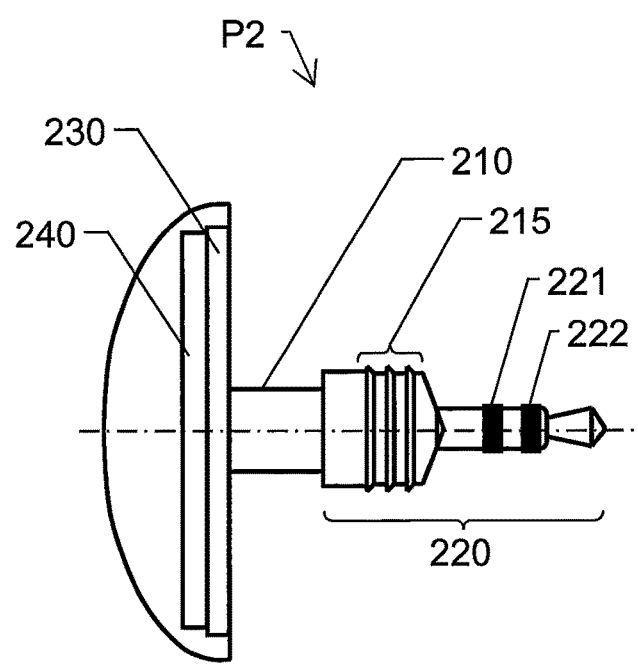
Fig. 2a                    Fig. 2b

ANIMAL EAR TAG

This application is the U.S. national phase of International Application No. PCT/SE2019/050457 filed May 20, 2019 which designated the U.S. and claims priority to SE Patent Application No. 1850606-3 filed May 23, 2018, the entire contents of each of which are hereby incorporated by reference.

TECHNICAL FIELD

The present invention relates generally to remote monitoring of animals, for example livestock animals. More particularly the invention relates to an animal ear tag according to claim 1.

BACKGROUND

Various kinds of animal markings have been known as long as animals have been domesticated. Markings in the form of ear tags is however a comparatively new concept. The ear tag is typically made of plastic or metal, and may be used for more than simple optical identification. For example, the ear tag may use Radio Frequency Identification Device (RFID) technology to convey information. In such a case, it is often referred to as an electronic ear tag. Electronic ear tags usually conform to international standards ISO 11784 and ISO 11785 working at 134.2 kHz, as well as ISO/IEC 18000-6C operating in the UHF spectrum. There are other non-standard systems working at 125 kHz. Although many shapes of ear tags exist, the main types in current use are flag-shaped ear tag, button-shaped ear tag, plastic clip ear tag, metal ear tag and electronic ID tag.

The flag-shaped ear tag contains two discs that are joined through the ear, one or both bearing a wide, flat plastic surface on which identification details are written or printed in large, easily legible script. The button-shaped ear tag has two discs joined through the ear. The plastic clip ear tag is a molded plastic strip, folded over the edge of the ear and joined through it. The metal ear tag is typically aluminum, steel or brass rectangle with sharp points, which is clipped over the edge of the ear, with the identification stamped into it. The electronic ID tag includes an EID number. It may also have a management number on the back of the ear. The two numbers may further be combined as a matched set, which includes visual tags with electronic ID tags. Basically, all of the above tags may carry a RFID chip, although the metal-types of tags are usually less suitable for electromagnetic shielding reasons. Normally, the RFID chip carries an electronic version of the optical identification number on the tag.

WO 2016/172745 shows an animal ear tag which is intended to be anchored on an animal's ear by means of a dome and which has a housing enclosing an electronics assembly and a battery. A visible panel surface of the ear tag shows animal identification data. The panel surface is located below the housing when the ear tag is placed on the animal. The center of gravity of the housing and of the parts enclosed by the latter lies inside an area protruding downwards from the spike axis, which area is not higher than 2 cm and, in the horizontal lying normal to the spike axis, is not wider than 1 cm. This ensures a particular orientation of the tag when attached to the animal.

U.S. Pat. No. 9,848,577 describes an ear tag assembly which has a tag, a backing member and an elongated shaft assembly configured to pierce and extend through an outer ear of the animal. A first temperature sensor is disposed within the shaft assembly to obtain an ear temperature measurement of the animal. A second temperature sensor obtains an ambient temperature measurement adjacent the animal. A control circuit accumulates temperature data from the first and second temperature sensors in a tag memory for subsequent transfer, via a wireless communication network, to a data collection unit. Additional sensors may be utilized. In some cases, the backing member may house a battery to power the control circuit. The backing member may be removably attachable to the shaft to allow replacement of the battery.

Thus, an ear tag is known whose housing has such a center of gravity that the tag obtains a particular orientation on the animal. The prior art also includes an example of an ear tag assembly containing a tag, a shaft and a backing member, where the backing member contains a power source.

However, there is yet no example of an animal ear tag designed to facilitate high-frequency radio communication, e.g. in the UW band, with one or more fixed stations.

SUMMARY

The object of the present invention is therefore to offer a solution that solves the above problem and improves the chances good line-of-sight visibility to the ear tag from a wide range of surrounding positions.

According to one aspect of the invention, the object is achieved by animal ear tag that includes control circuitry, an antenna and an energy storage. The control circuitry is configured to generate data relating to an animal to which the animal ear tag is attached. For example, the data may reflect an identity, a condition, a status, an activity and/or a behavior of the animal. The antenna is configured to emit a wireless signal containing the generated data. The energy storage is configured to provide electric energy to the control circuitry and the antenna. When attached to the animal, the first and second parts are interconnected via a shaft member, which is inserted through the animal's ear in such a manner that the first part is located on a first side of the ear and the second part is located on a second side of the ear, opposite to the first side. When the first and second parts are interconnected, the energy storage is located off-centered from a symmetry axis of the shaft member.

This animal ear tag is advantageous because its design enables positioning in the animal's ear to which there is an overall good line-of-sight visibility. The proposed design also vouches for a predictable orientation of the tag in the animal's ear.

Preferably, the energy storage is offset from the symmetry axis of the shaft member by a distance being at least 30% of an overall measure of the animal ear tag measured in a direction perpendicular to the symmetry axis. Thereby, it can be ensured that the tag has a stable orientation. Further, it becomes straightforward to arrange the tag in a manner that is adapted to the animal's anatomy, such that the orientation stability is further improved. This is particularly the case, if, in a cross-section parallel to the symmetry axis, the first part has a general L-profile where a first leg comprises means configured to receive the shaft member and a second leg comprises the energy storage. Preferably, the energy storage has an elongated extension in a direction being transversal to an extension of the second leg. Namely, thereby the first part can be conveniently fitted to enclose a bulging vein in the animal's ear. As a result, the first part stays snuggly in place on the proximal side of the ear while the second part remains visible on the distal side of the ear.

According to one embodiment of this aspect of the invention, the shaft member is comprised in the second part. This namely facilitates attaching the tag to the animal and enables a compact design.

According to another embodiment of this aspect of the invention, the energy storage is arranged in a first part of the animal ear tag and the antenna is arranged in a second part of the animal ear tag. The first and second parts are interconnected in a dis-and re-connectable manner. This simplifies exchanging the energy storage, for example if a battery therein is depleted.

Preferably, the second part further contains an electric plug member and the first part contains an electric socket member configured to receive the electric plug member so as to establish electric contact between the energy storage and the control circuitry when the first and second parts are interconnected. Such a plug-and-socket design is advantageous because it renders dis-and re-connection of the first and second parts very straightforward.

According to still another embodiment of this aspect of the invention, the electric plug and socket members are symmetrically arranged with respect to the symmetry axis of the shaft member. This further simplifies attaching the tag to the animal.

According to a further embodiment of this aspect of the invention, the electric plug and/or the electric socket member contains a sealing arrangement configured to prevent moisture from entering into the animal ear tag. Thereby, the risk of humidity-related damages to the tag's interior is reduced.

According to another embodiment of this aspect of the invention, the energy storage contains a primary cell battery, a secondary cell battery, a capacitor bank and/or a Graphene supercapacitor. Thus, the energy storage can be relatively small-sized, and yet ample amounts of electric energy can be provided to the control circuitry and the antenna.

According to yet another embodiment of this aspect of the invention, the second part also contains the control circuitry. Namely, to facilitate energy replenishment, it is desirable that the part containing the energy storage is separated from all the non-exchangeable parts. Further, it is advantageous if the second part contains an accelerometer configured to produce movement data to be included in said animal-related data, which movement data describe how the tag alters its position over time along at least one dimension in space. Consequently, based on the emitted data, advanced animal behavioral analyses can be made.

Additional advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIGS. 1a-b show one embodiment of a first part of a proposed animal ear tag;

FIGS. 2a-b show one embodiment of a second part of an animal ear tag according to the invention;

DETAILED DESCRIPTION

FIGS. 1a, 1b, 2a and 2b show first and second parts of an animal ear tag 100 according to one embodiment of the invention. The animal ear tag 100 contains control circuitry 230, an antenna 240 and an energy storage 130.

As is apparent from FIGS. 1a and 1b, the energy storage 130 is arranged in a first part P1 of the animal ear tag 100, and as shown in FIGS. 2a and 2b, the antenna 240 is arranged in a second part P2 of the animal ear tag 100. Preferably, the second part P2 also contains the control circuitry 230 because thereby the signal path between the control circuitry 230 and the antenna 240 can be minimized, and the design can be made physically compact.

Figure 3:
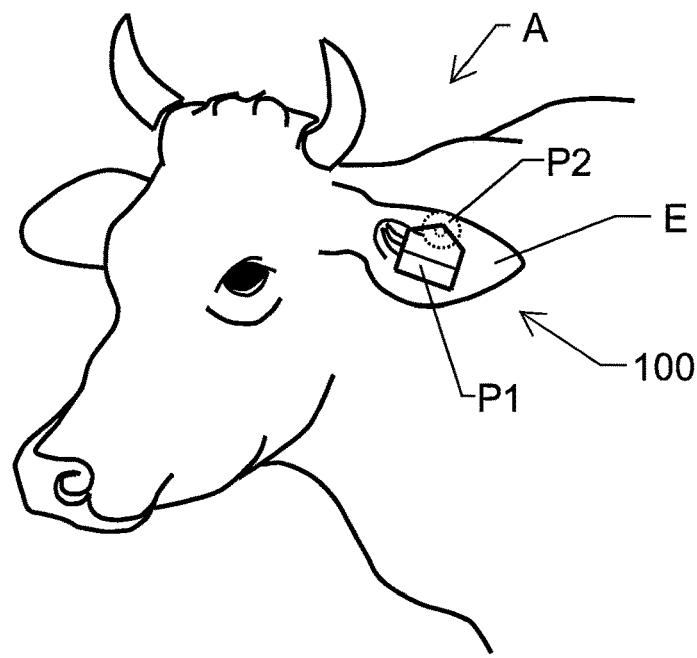
FIG. 3 illustrates how the proposed animal ear tag may be attached to an animal.

Turning now to FIG. 3, we see how the proposed animal ear tag 100 can be attached to the ear E an animal A. When attached to the animal A, the first and second parts P1 and P2 respectively are interconnected via a shaft member 210. The shaft member 210, in turn, is inserted through the outer ear E of the animal A in such a manner that the first part P1 is located on a first side S1 of the ear E and the second part P2 is located on a second side S2 of the ear E opposite to the first side S1. Preferably, the first side S1 is the ear's E outer/distal side and the second side S2 is the ear's E inner/proximal side. Namely, such an arrangement of the tag 100 improves the chances of obtaining good line-of-sight visibility to the tag 100 from a wide range of surrounding positions.

The control circuitry 230 is configured to generate data relating to the animal A to which the animal ear tag 100 is attached. The generated data may reflect anything from a simple identity, e.g. a string of characters, to complex sets of parameters describing a condition, a status, an activity and/or a behavior of the animal A. To generate such complex sets of parameters, the control circuitry 230 may be associated with various kinds of sensors, for example in the form of accelerometers, gyroscopes and/or temperature sensors.

The antenna 240 is configured to emit a wireless signal containing said generated data. Thereby, after reception in one or more fixed stations, the data may be processed/analyzed by processors being substantially more resourceful and energy demanding than what can be integrated into the tag 100. Moreover, if the emitted signal is received by a sufficiently large number of fixed stations, a position for the tag 100 can be determined based on triangulation.

The energy storage 130 is configured to provide electric energy to the control circuitry 230 and the antenna 240. Thus, the energy storage 130 may contain a primary cell battery (i.e. non-re-chargeable battery), a secondary cell battery (i.e. a rechargeable battery) a capacitor bank and/or a Graphene supercapacitor.

As is apparent from FIG. 3, when the first and second parts P1 and P2 are interconnected, the energy storage 130 is located off-centered from a symmetry axis C-S of the shaft member 210. This causes the second part P2 and the antenna 240 therein to be directed out from the ear E, and thus be clearly visible. It is advantageous if the energy storage 130 is offset from the symmetry axis C-S by a distance $d_{OFF}$, which is at least 30% of an overall measure W of the animal ear tag 100 measured in a direction perpendicular to the symmetry axis C-S. Such geometry of the design results in that the second part P2 is forced up and outwards relative to a hole through which the shaft member 210 passes; and conversely, the first part P1 is rotated downwards against the proximal side of the ear E. Naturally, an even further offset of the energy storage 130 from the symmetry axis C-S amplifies this effect. In the design illustrated in FIG. 3, the distance $d_{OFF}$ is approximately 50% of the overall measure W.

Figure 4:
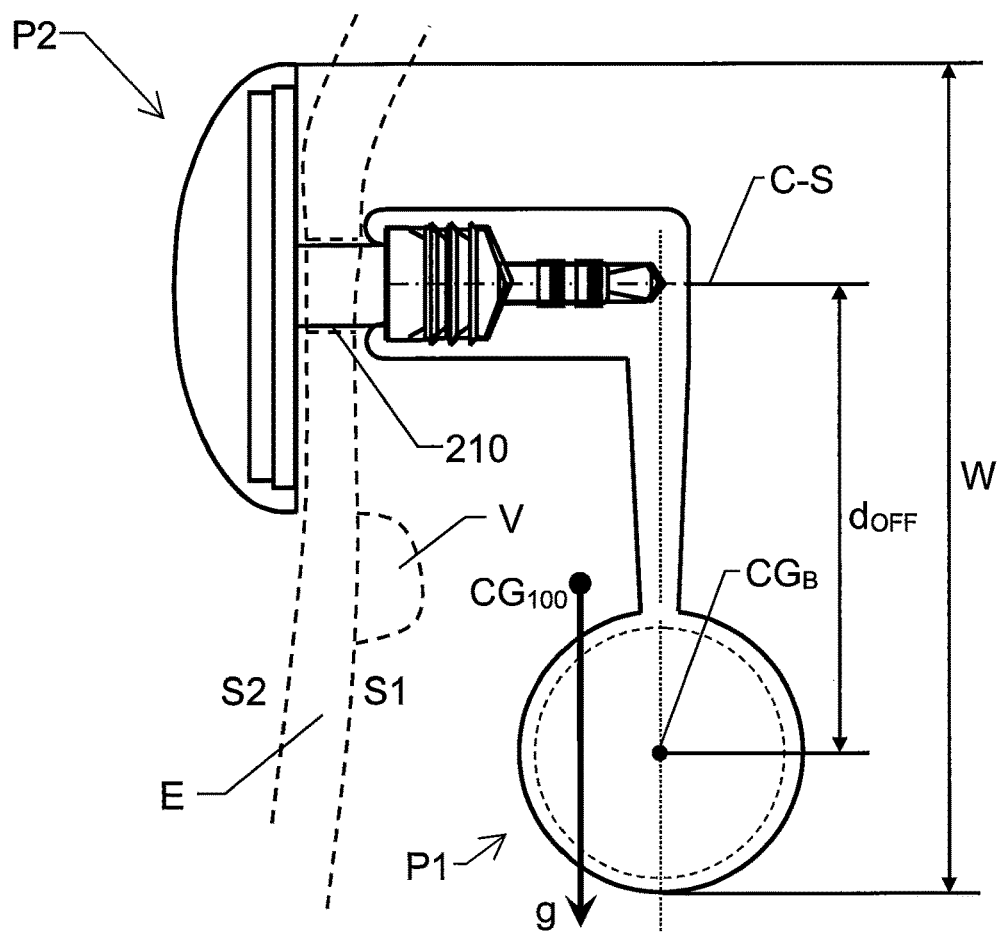
FIG. 4 shows an example of how the first and second parts of the animal ear tag are interconnected and attached to an animal.

Turning now to FIG. 4, we see an embodiment of the invention where the first part P1 has a general L-profile in a cross-section parallel to the symmetry axis C-S. In this L-profile, a first leg contains means configured to receive the shaft member 210, for instance a female type of connector. A second leg of the L-profile contains the energy storage 130, which, in turn, may have an overall cylindrical shape. Such an L-profile type of design is beneficial in combination with an energy storage 130 being elongated in a direction that extends transversely to said second leg. Namely, thereby the first part P1 can be fitted to enclose a bulging vein V in the ear E; and as a result, the first part P1 stays in place in the proximal side S1 of the ear E while the second part P2 stays visible on the distal side S2 of the ear E.

Figure 5:
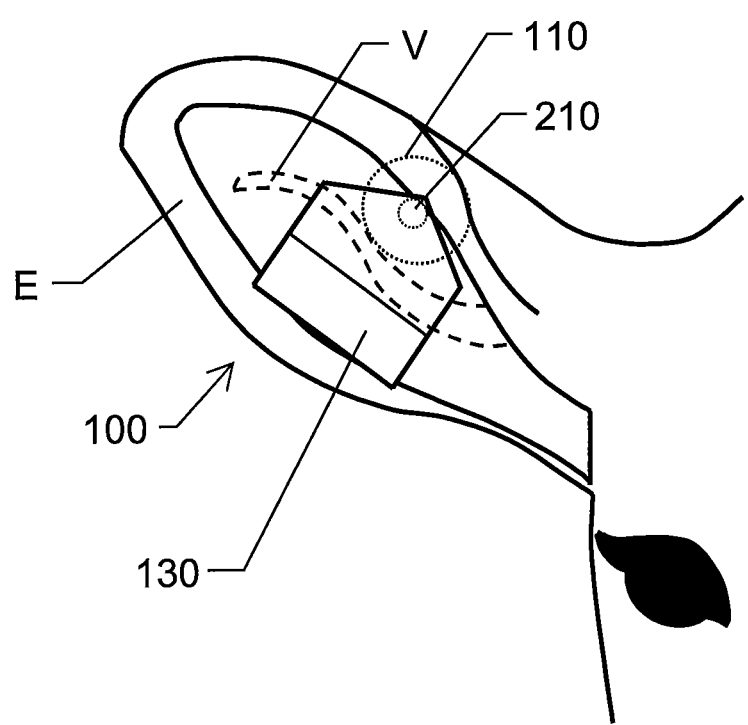
FIG. 5 illustrates in further detail how the animal ear tag may be positioned in an animal's ear.

FIG. 5 shows another view of the ear E illustrating how the shaft member 210 extends through the ear E above the vein V and the energy storage 130 extends below and in parallel with the vein V.

Since the energy storage 130 may be depleted before the tag 100 as such has served its purpose, it is advantageous if the first part P1 can be replaced during the operational life span of the tag 100. Therefore, according to one embodiment of the invention, the first and second parts P1 and P2 are interconnected in a dis-and re-connectable manner. It is further beneficial if the shaft member 210 is included in the second part P2 because thereby the design can be made relatively compact. Incorporating the shaft member 210 in the second part P2 also facilitates attaching the tag 100 to the ear E of the animal A.

To allow convenient dis-and re-connection of the second part P2 to the first part P1, the second part P2 may contain an electric plug member 220; and analogously, the first part P1 may contain an electric socket member 120 configured to receive the electric plug member 220. Thereby, electric contact can be established between the energy storage 130 and the control circuitry 230 when the first and second parts P1 and P2 are interconnected. Further, to simplify the assembly, it is beneficial if the electric plug and socket members 220 and 120 respectively are symmetrically arranged with respect to the symmetry axis C-S of the shaft member 210. Namely, this renders the mechanical connection independent from a relative rotation between the first and second parts P1 and P2 around the symmetry axis C-S.

To reduce the risk of humidity-related damage to the interior of the tag 100, the electric plug member 220 and/or the electric socket member 120 may contain a sealing arrangement 215 and 115 respectively configured to prevent moisture from entering into the tag 100. The embodiment illustrated in FIG. 1a, shows such a first sealing arrangement 115 comprising a set of frustum cones arranged after one another along an axis. In FIG. 2b, a corresponding second sealing arrangement 215 is shown in the form of a set of flexible flanges surrounding a midsection of the plug member 220. Said midsection is located between the shaft member 210 and a tip of the second part P2 that contains a pair of electric contacts separated from one another by insulation rings 221 and 222 respectively. The electric socket member 120 is provided with contact members 121 and 122 matching the electric contacts of the second part P2. FIG. 3 illustrates how each frustum cone in the first sealing arrangement 115 engages a respective flexible flange of the second sealing arrangement 215.

In one embodiment of the invention, the second part P2 contains an accelerometer (not shown), which is configured to produce movement data to be included in the generated data relating to the animal A. The movement data describe how the animal ear tag 100 alters its position over time along at least one dimension in space. In other words, the movement data may express a space vector representing an acceleration, a velocity or a relative position depending on a degree of temporal integration.

The animal ear tag 100 described herein is suitable for any kind of animals that shall be monitored, supervised, analyzed or simply identified in a contactless manner.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An animal ear tag (100) comprising:
control circuitry (230) configured to generate data relating to an animal (A) to which the animal ear tag (100) is attached,
a first part (P1);
a second part (P2);
a shaft member (210) that interconnects the first and second parts (P1; P2);
an antenna (240) configured to emit a wireless signal con-taining said generated data, the antenna (240) being arranged in the second part (P2) of the animal ear tag (100); and
an energy storage (130) configured to provide electric energy to the control circuitry (230) and the antenna (240), the energy storage (130) being arranged in the first part (P1) of the animal ear tag (100);
wherein when attached to the animal (A) the first and second parts (P1; P2) are interconnected via a shaft member (210) inserted through an ear (E) of the animal (A) in such a manner that the first part (P1) is located on a first side (S1) of the ear (E) and the second part (P2) is located on a second side (S2) of the ear (E) opposite to the first side (S1), and
wherein when the first and second parts (P1; P2) are interconnected the energy storage (130) is located off-centered (dOFF) from a symmetry axis (C-S) of the shaft member (210).

2. The animal ear tag (100) according to claim 1, wherein the energy storage (130) is offset from the symmetry axis (C-S) by a distance (dOFF) being at least 30% of an overall measure (W) of the animal ear tag (100) measured in a direction perpendicular to the symmetry axis (C-S).

3. The animal ear tag (100) according to claim 1, wherein the shaft member (210) is comprised in the second part (P2).

4. The animal ear tag (100) according to claim 3, wherein, in a cross-section parallel to the symmetry axis (C-S), the first part (P1) has a general L-profile in which a first leg comprises a connector configured to receive the shaft member (210) and a second leg comprises the energy storage (130).

5. The animal ear tag (100) according to claim 4, wherein the energy storage (130) has an elongated extension in a direction being transversal to an extension of the second leg.

6. The animal ear tag (100) according to claim 1, wherein the first and second parts (P1; P2) are interconnected in a dis- and re-connectable manner.

7. The animal ear tag (100) according to claim 1, wherein the second part (P2) comprises an electric plug member (220) and the first part (P1) comprises an electric socket member (120) configured to receive the electric plug member (220) so as to establish electric contact between the energy storage (130) and the control circuitry (230) when the first and second parts (P1; P2) are interconnected.

8. The animal ear tag (100) according to claim 7, wherein the electric plug and socket members (220; 120) are symmetrically arranged with respect to the symmetry axis (C-S) of the shaft member (210).

9. The animal ear tag (100) according to claim 7 wherein at least one of the electric plug and socket members (220; 120) comprises a sealing arrangement (215; 115) configured to prevent moisture from entering into the animal ear tag (100).

10. The animal ear tag (100) according to claim 1, wherein the energy storage (130) comprises at least one of: a primary cell battery, a secondary cell battery, a capacitor bank, and a Graphene supercapacitor.

11. The animal ear tag (100) according to claim 1, wherein the second part (P2) further comprises the control circuitry (230).

12. The animal ear tag (100) according to claim 1, wherein the second part (P2) further comprises an accelerometer configured to produce movement data to be included in said data relating to the animal (A), which movement data describe how a position of the animal ear tag (100) is altered over time along at least one dimension in space.

13. The animal ear tag (100) according to claim 2, wherein the shaft member (210) is comprised in the second part (P2).

14. The animal ear tag (100) according to claim 13, wherein, in a cross-section parallel to the symmetry axis (C-S), the first part (P1) has a general L-profile in which a first leg comprises a connector configured to receive the shaft member (210) and a second leg comprises the energy storage (130).

15. The animal ear tag (100) according to claim 14, wherein the energy storage (130) has an elongated extension in a direction being transversal to an extension of the second leg.

16. The animal ear tag (100) according to claim 8 wherein at least one of the electric plug and socket members (220; 120) comprises a sealing arrangement (215; 115) configured to prevent moisture from entering into the animal ear tag (100).

17. The animal ear tag (100) according to claim 1, wherein the energy storage (130) comprises a battery.

18. The animal ear tag (100) according to claim 1, wherein the energy storage (130) comprises a capacitor bank.

19. The animal ear tag (100) according to claim 1, wherein the energy storage (130) comprises a Graphene supercapacitor.

20. The animal ear tag (100) according to claim 1, wherein,
the first and second parts (P1; P2) are interconnected in a dis- and re-connectable manner, and
the second part (P2) comprises an electric plug member (220) and the first part (P1) comprises an electric socket member (120) configured to receive the electric plug member (220) so as to establish electric contact between the energy storage (130) and the control circuitry (230) when the first and second parts (P1; P2) are interconnected.

* * * * *